Nov. 3, 1936.  G. DYKSTRA  2,059,509
WINDSHIELD CLEANER
Filed Sept. 14, 1932
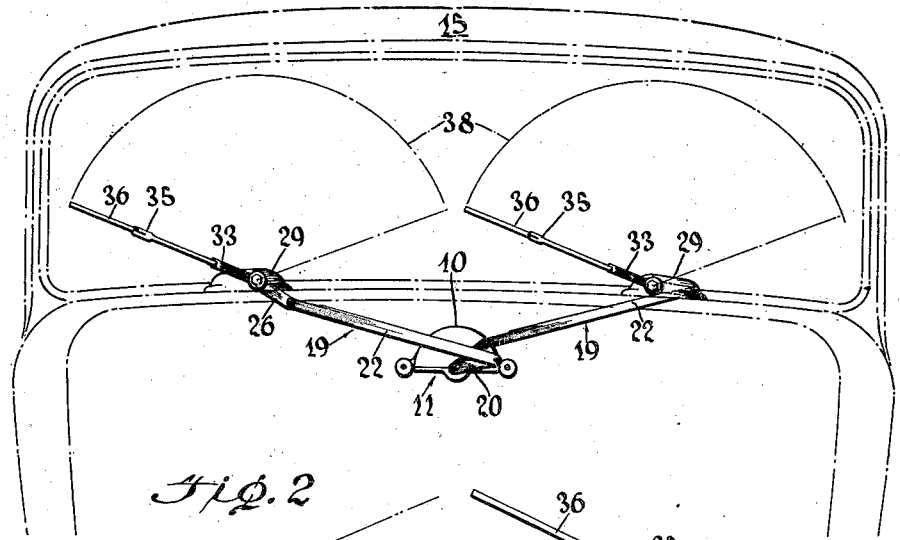
Fig. 1
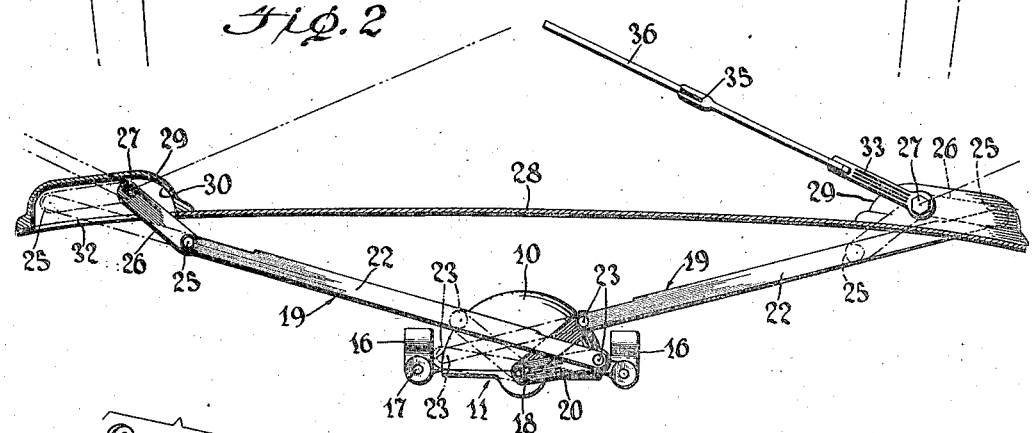
Fig. 2
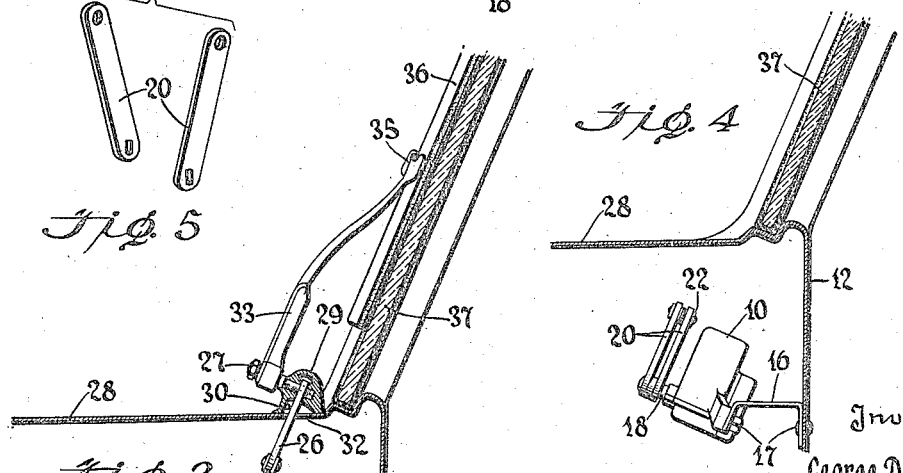
Fig. 5
Fig. 3
Fig. 4
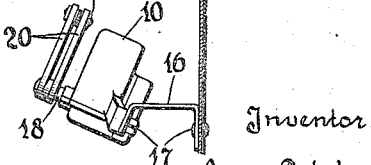
Inventor
George Dykstra
By Beau & Brooks
Attorneys Patented Nov. 3, 1936

2,059,509

UNITED STATES PATENT OFFICE 2,059,509

WINDSHIELD CLEANER

George Dykstra, Buffalo, N. Y., assignor to Trico Products Corporation, Buffalo, N. Y.

Application September 14, 1932, Serial No. 633,173

5 Claims. (Cl. 15—255)

This invention relates to windshield cleaners for motor vehicles and it has particular relation to a linkage arrangement connecting cleaner motor to wiper arm shafts.

In the construction of modern motor vehicles, the tendency has been more and more toward streamlining, and hence the shape of the body at the location adjacent and along the upper portion of the windshield is such that it is not convenient or expedient to install a windshield cleaner motor, etc. in the vehicle header bar. It is desirable to avoid, as much as possible, exterior projections on the vehicle.

According to this invention it is proposed to locate the cleaner motor beneath the vehicle cowl and provide linkage units connecting the motor to wiper arm shafts that are mounted upon supports immediately above or carried by the cowl. Since the popularity of the double windshield wiper has increased, it is desirable to provide an arrangement which will accommodate this type of assembly. However, in a construction of this kind, the cleaner motor must necessarily be located considerably out of alignment with the spaced windshield wiper arm supports. While certain types of linkage have been employed for transmitting power from the motor to the wiper, there has been a tendency for binding of the parts as well as other inefficient phases of operation.

This invention is particularly adapted to provide a transmission linkage from the motor to the wiper arm support and arranged in such manner that the greatest possible leverage advantage is secured for the relative positions of the motor and wiper. To this end, crank members are connected to both the cleaner motor shaft and the wiper arm supporting shaft, together with a link pivotally connecting these crank members. The shaft of the cleaner motor oscillates through a predetermined angle, and when two wiper units are employed, the crank members on the shaft are so arranged that the positions of the limits of movement of the connecting points of the link and the crank members of one unit define a substantially straight line. The linkage unit for each wiper shaft will be practically the same but the angular relation of the crank member on the motor for one linkage unit will be different from the angular relation of the other according to the relative positions of the parts. Inasmuch as the pivotal points of the links and crank member at their extreme positions with respect to each stroke of the motor define a straight line, the most advantageous leverage is insured for the transmission of power from the motor to the wipers.

In the drawing:

Fig. 1 is a front elevation of a windshield cleaning device and illustrating its relation to a vehicle that is shown in broken lines;

Fig. 2 is a cross section of a vehicle cowl and an elevation of a cleaning device mounted thereon;

Fig. 3 is a fragmentary vertical section of portions of a vehicle and portions of a cleaning device shown in side elevation mounted on the vehicle;

Fig. 4 is a fragmentary vertical section of a vehicle illustrating the mounting of the motor upon a vehicle dash; and Fig. 5 is a disassembled view of crank arms for the cleaner motor.

In practicing the invention a cleaner motor 10 of a windshield cleaning device 11 is mounted upon a dash 12 of a motor vehicle 15 by means of brackets 16 secured to the dash and to the cleaner motor. Suitable fastening devices 17 secure the brackets to the dash and to the motor.

This cleaner motor is operated under the influence of differential fluid pressure in the manner disclosed in Patent No. 1,522,344 dated January 6, 1925, for oscillating its drive shaft 18. A pair of power transmission linkage units 19 are connected to the motor 10 and comprise a pair of crank arms 20 that are rigidly secured to the outer end portion of the shaft 18 and extend rigidly at angles to each other. Oppositely extending links 22 are provided with pivotal connections 23 for securing them to the outer ends of the crank arms 20 and the outer ends of the links likewise have pivotal connections 25 for securing them to the outer ends of arms 26 that are rigidly connected to wiper arm supporting shafts 27. The upper surface of the vehicle cowl 28 is provided with a pair of shaft supports 29 shell like in form and having recesses 30 therein registering with slots 32 formed in the cowl to provide ample space for swinging movement of the arms 26. Wiper arms 33 are rigidly supported upon the outer ends of the shafts 27 and have pivotal connections 35 to wiper blades 36 arranged for oscillating movement across the surface of an inclined windshield 37.

It is apparent that by operating the motor 10, the wiper blades are oscillated by power transmitted through the linkage units 19 to cleanse the portion of the windshield defined by the broken lines 38. As illustrated in Fig. 2, the limits of oscillation or pivotal movement of the arms 20 and 26 are indicated between the full line positions and the broken line positions of these arms. It is to be understood that the shaft of a motor of the type described oscillates through a definite predetermined angle according to the manner in which the motor is manufactured. That is, the angle of oscillation of the motor shaft is a known value.

The four extreme positions of the pivotal connections 23 and 25 of each linkage unit 19 define substantially a straight line. The angular positions of the arms 20 depend upon the relative position of the wiper arm shafts 27. It is not necessary that the arms 20 and 26 shall be exactly the same length, but it is essential, in order to obtain the most advantageous leverage with respect to the links 22 and arms 20 and 26, that the chords defined by the limits of the arc of movement of the outer ends of the arms should be the same length. That is, the chord of the arc defined by the movement of the pivotal connection 25 should be the same length as the chord of the arc defined by the pivotal movement of the connection 23. These conditions are necessary in order that the opposite extreme positions of the pivotal connections 23 and 25 of each linkage unit define a substantially straight line. In the event the arm 20 should be shorter or longer than the arm 26, then care should be exercised to maintain the equality in the lengths of the chords of the arc defined by the opposite extreme positions of the respective arms.

By arranging the linkage elements in the manner described, the line bisecting the angle traversed by the arm 26 is perpendicular to the straight line defined by the pivotal connections 23 and 25 referred to above. By this construction and arrangement it will be apparent that the leverage involved in operating both the wiper arm shafts 27 is substantially the same and provides for a maximum efficiency of lever advantage with reference to a given angular oscillation of a fluid motor. It is of course to be understood that the relative positions of the motor 10 and shafts 27 can be varied within considerable limits to accommodate the peculiar construction of various types and sizes of automobiles and still maintain the straight line relation of the pivotal connections defining the limits of oscillation of the crank arms.

Although only one form of the invention has been shown and described in detail it will be apparent to those skilled in the art that the invention is not so limited but that various changes may be made therein without departing from the spirit of the invention or from the scope of the appended claims.

What is claimed is:

1. In a linkage structure for operating windshield wipers, an oscillatable windshield cleaner motor shaft, means for rotatably supporting said shaft, a pair of crank arms extending rigidly from the motor shaft for operation thereby within predetermined limits of oscillation and defining substantially a V-shape, a wiper arm supporting shaft having a crank portion extending therefrom and being spaced on one side of said pair of crank arms, means for rotatably supporting the latter shaft, a member pivotally connecting the outer end of one crank arm to the outer end of said crank portion and extending across and beyond the other crank arm, a second wiper arm supporting shaft having a second crank portion extending therefrom and being spaced on the other side of said pair of crank arms, means for rotatably supporting the latter shaft, and a second member pivotally connecting the outer end of said other crank arm to the outer end of said second crank portion and extending across and beyond said one crank arm.

2. In a linkage structure for operating windshield wipers, a pair of angularly disposed oscillatably driven crank arms movable through predetermined overlapping arcs, means for rotatably supporting the crank arms about a common axis of oscillation, two wiper actuating devices including a second pair of crank arms for operating wiper elements and spaced on opposite sides of the pair of driven crank arms, means for rotatably supporting each arm of the second pair of crank arms, links pivotally connecting the driven crank arms to the second crank arms, the angular positions of the cranks with relation to the relative location of their several axes, and the relative lengths of the cranks and links being such that the ends of the arcs described by both pivotal connections of each link lie in substantially a straight line.

3. In a linkage structure for operating windshield wipers, a pair of angularly disposed oscillatably driven crank arms movable through predetermined overlapping arcs of less than 180 degrees, means for rotatably supporting the crank arms about a common axis of oscillation, two wiper actuating devices including a second pair of crank arms for operating wiper elements and spaced on opposite sides of the pair of driven crank arms, means pivotally supporting the crank arms of the second pair about spaced parallel arms, the common axis of said angularly disposed arms being offset from the plane containing the spaced parallel axes of the pivotal supports of the second pair of arms, and links pivotally connecting the driven crank arms to the second crank arms at points spaced from the axes of the respective crank arms, each link extending diagonally across the quadrilateral enclosed between the axes and link connections of its related crank arms.

4. In a linkage structure for operating windshield wipers, a pair of angularly disposed oscillatably driven crank arms movable through predetermined overlapping arcs of less than 180 degrees, means for rotatably supporting the crank arms about a common axis of oscillation, two wiper actuating devices including a second pair of crank arms and spaced on opposite sides of the pair of driven crank arms, means for pivotally supporting the wiper actuating crank arms about spaced parallel axes, and a link connecting each wiper actuating crank arm to the more remote of the driven crank arms.

5. A vehicle windshield cleaner assembly comprising a driven crank arm, means for rotatably supporting said crank arm, a wiper actuating crank arm spaced from the driven crank arm, a link pivotally connecting the two crank arms to transmit rotative motion to the actuating arm, a streamlined shell-like support having a member thereon rotatably supporting the wiper actuating crank arm and having a connection from the member extending from one side of the shell-like support to support a wiper, said shell-like support having an opening, an end portion of the wiper actuating crank arm being oscillatable through said opening incidentally to the operation of the driven crank arm and said end portion having its connection with said member in said shell-like support, said shell-like support having means for mounting it upon a vehicle cowl.

GEORGE DYKSTRA.